(12) United States Patent
Miyawaki et al.

(10) Patent No.: US 6,408,100 B2
(45) Date of Patent: *Jun. 18, 2002

(54) METHOD AND DEVICE OF MOVING PICTURE DECODING

(75) Inventors: Katsuki Miyawaki, Kawasaki; Hirohiko Inagaki; Tadayoshi Kono, both of Yokohama; Mitsuhiko Ohta; Koichi Yamashita, both of Kawasaki, all of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/154,702

(22) Filed: Sep. 17, 1998

(30) Foreign Application Priority Data

Oct. 31, 1997 (JP) ............................................. 9-300210

(51) Int. Cl.[7] ................................................. G06K 9/36
(52) U.S. Cl. ....................................... 382/233; 382/232
(58) Field of Search .................................. 348/384, 385, 348/403–419; 382/232, 233, 234, 235, 236; 375/240; 386/111–109, 112–33; 711/151–158

(56) References Cited

U.S. PATENT DOCUMENTS

| | | | | |
|---|---|---|---|---|
| 5,321,750 A | * | 6/1994 | Nadan | 380/20 |
| 5,563,660 A | * | 10/1996 | Tsukagoshi | 348/384 |
| 5,598,215 A | * | 1/1997 | Watanabe | 348/416 |
| 5,767,799 A | * | 6/1998 | Maertens | 341/67 |
| 6,122,316 A | * | 9/2000 | Varanasi et al. | 375/240 |

\* cited by examiner

*Primary Examiner*—Phuoc Tran
*Assistant Examiner*—Amir Alavi
(74) *Attorney, Agent, or Firm*—Staas & Halsey LLP

(57) ABSTRACT

A display parameter synchronous holding circuit 20 comprises a register group 21 for receiving display parameters DP separated by variable length decoding circuit, a selector 24 for selecting and outputting either the display parameters DP or the output of the register group 21, register group 22 for receiving the output of the selector 24, a register group 23 for storing the output of the register group 22 in response to VSYNC, and a control circuit 25 for causing the selector 24 to select the output of the register group 21 and making latch signals SH2 and SH1 to register groups 22 and 21 active in the order when the picture coding type PCT indicates I-picture or P-picture, and for causing the selector 24 to select DP and making SH2 active when PCT indicates B-picture.

6 Claims, 5 Drawing Sheets

METHOD AND DEVICE OF MOVING PICTURE DECODING

BACKGROUND OF THE INVENTION

1. Field of the Invention

The present invention relates to a method of and a device for moving picture decoding.

2. Description of the Related Art

In a moving picture decoding device, a decoding process is carried out in the order of coded data which is provided, and the data is stored in a frame memory, wherein the decoded picture data is read out of the frame memory in the order of original pictures. The read data is processed in compliance with display parameters and converted into analog video signals.

The display parameters are as follows;
in picture display extension, three sets of frame center offsets (horizontal and vertical offsets),
in picture spatial scalable extension,
spatial temporal weight code table index for up sample;
lower layer vertical offset;
lower layer horizontal offset;
lower layer temporal reference; and
lower layer interlaced field select;
repeat first field; and
top field first.

In FIG. 5, I, B and P respectively indicate I-picture, B-picture and P-picture, and numbers attached to the I, B, and P show a sequence of decoding process.

The display parameters are separated by a variable length decoding circuit and are used in a display circuit. After use, the contents thereof are released. For example, in FIG. 5, while a decoding process of I1, B2, B3 and P4 is sequentially performed, the display parameters are separated by the variable length decoding circuit for every picture and are stored in the respective register groups 1 to 4. The contents thereof are released when a data process in the display circuit is finished as to corresponding picture, and they can be overwritten. The hatched sections in FIG. 5 are released periods. Next, while a decoding process of B5, B6 and P7 is carried out in order, the display parameters are separated for every picture by the variable length decoding circuit, and each of them is stored in register groups 2, 3 and 1 in the order of release.

Since in a prior art moving picture decoding device four sets of register groups were required in order to hold display parameters, this caused enlargement of the circuit configuration. Furthermore, in storing and reading the display parameters, since it was necessary to properly select one of the four register groups, the control was complicated.

SUMMARY OF THE INVENTION

In view of above problems, it is an object of the present invention to provide a method of and a device for moving picture decoding which are able to reduce the configuration of a display parameter synchronous holding circuit and to simplify its control operation.

In the 1st aspect of the present invention, there is provided a moving picture decoding device which separates display parameters and a picture coding type from coded data, decodes the coded data, stores the separated display parameters, reads the stored display parameters in the order of display pictures, and processes decoded data according to the read display parameters, the decoding device comprising: a first, a second and a third register groups; and a control circuit for storing a content of the first register group into the second register group and storing the separated display parameters into the first register group when the picture coding type indicates a reference picture, and for storing the separated display parameters into the second register group when the picture coding type indicates a non-reference picture; wherein a content of the second register group is stored as display parameters in the order of the display pictures into the third register group in synchronization with a display synchronization signal.

With the 1st aspect of the present invention, since only three sets of register groups are enough, the circuit configuration can be reduced in comparison with a prior art where four sets are provided. Furthermore, since storing control is carried out with respect to the 1st register group or the 2nd register group in compliance with picture coding type, an effect of simplifying the control can be obtained. Still furthermore, since it is essential only that the output of the 2nd register group is stored in the 3rd register group in synchronization with the display synchronization signal and decoded data is processed in compliance with the output of the 3rd register group, it is not necessary to select one set from a plurality of sets of register groups, therefore data reading control from register groups can be simplified.

In the 2nd aspect of the present invention, there is provided a moving picture decoding device which separates display parameters and a picture coding type from coded data, decodes the coded data, stores the separated display parameters, reads the stored display parameters in the order of display pictures, and processes decoded data according to the read display parameters, the decoding device comprising: a first register group for receiving the separated display parameters, and for storing the separated display parameters in response to a first latch signal; a selecting circuit for outputting either the separated display parameters or an output of the first register group in compliance with a selection controlling signal; a second register group for receiving an output of the selecting circuit, and for storing the output of the selecting circuit in response to a second latch signal; a third register group for receiving an output of the second register group, and for storing the output of the second register group in response to a display synchronization signal; and a control circuit for outputting the selection controlling signal to select the output of the first register group, outputting the second latch signal with being activated and outputting the first latch signal with being activated when the picture coding type indicates a reference picture, and for outputting the selection controlling signal to select the separated display parameters, outputting the second latch signal with being activated when the picture coding type indicates a non-reference picture.

In the 3rd aspect of the present invention, there is provided a moving picture decoding device as defined in the 2nd aspect, wherein the control circuit comprises: a judging circuit for judging whether the picture coding type indicates the reference picture or the non-reference picture; and a control signal generating circuit for generating the selection controlling signal, the first latch signal and the second latch signal in compliance with judgement result of the judging circuit.

In the 4th aspect of the present invention, there is provided a moving picture decoding device according to in the 3rd aspect, wherein the judging circuit outputs a first pulse when the picture coding type indicates the reference picture, and outputs a second pulse when the picture coding type indicates the non-reference picture, and wherein the control signal generating circuit outputs the first pulse as the selection controlling signal, outputs a delayed signal of the first pulse as the first latch signal, and outputs a signal corresponding to a logical add of the first pulse and the second pulse as the second latch signal.

In the 5th aspect of the present invention, there is provided a moving picture decoding device as defined in the 1st aspect, wherein the display synchronization signal is a vertical synchronization signal.

In the 6th aspect of the present invention, there is provided a moving picture reproducing device including a moving picture decoding device, the decoding device separates display parameters and a picture coding type from coded data, decodes the coded data, stores the separated display parameters, reads the stored display parameters in the order of display pictures, and processes decoded data according to the read display parameters, the decoding device comprising: a first, a second and a third register groups; and a control circuit for storing a content of the first register group into the second register group and storing the separated display parameters into the first register group when the picture coding type indicates a reference picture, and for storing the separated display parameters into the second register group when the picture coding type indicates a non-reference picture; wherein a content of the second register group is stored as display parameters in the order of the display pictures into the third register group in synchronization with a display synchronization signal.

In the 7th aspect of the present invention, there is provided a moving picture decoding method which separates display parameters and a picture coding type from coded data, decodes the coded data, stores the separated display parameters, reads the stored display parameters in the order of display pictures, and processes decoded data according to the read display parameters, the method comprising the steps of: preparing a first, a second, and a third register groups; control circuit for outputting the selection controlling signal to select the output of the first register group, outputting the second latch signal with being activated and outputting the first latch signal with being activated when the picture coding type indicates a reference picture, and for outputting the selection controlling signal to select the separated display parameters, outputting the second latch signal with being activated when the picture coding type indicates a non-reference picture.

Other aspects, objects, and the advantages of the present invention will become apparent from the following detailed description taken in connection with the accompanying drawings.

DESCRIPTION OF PREFERRED EMBODIMENT

Figure 1:
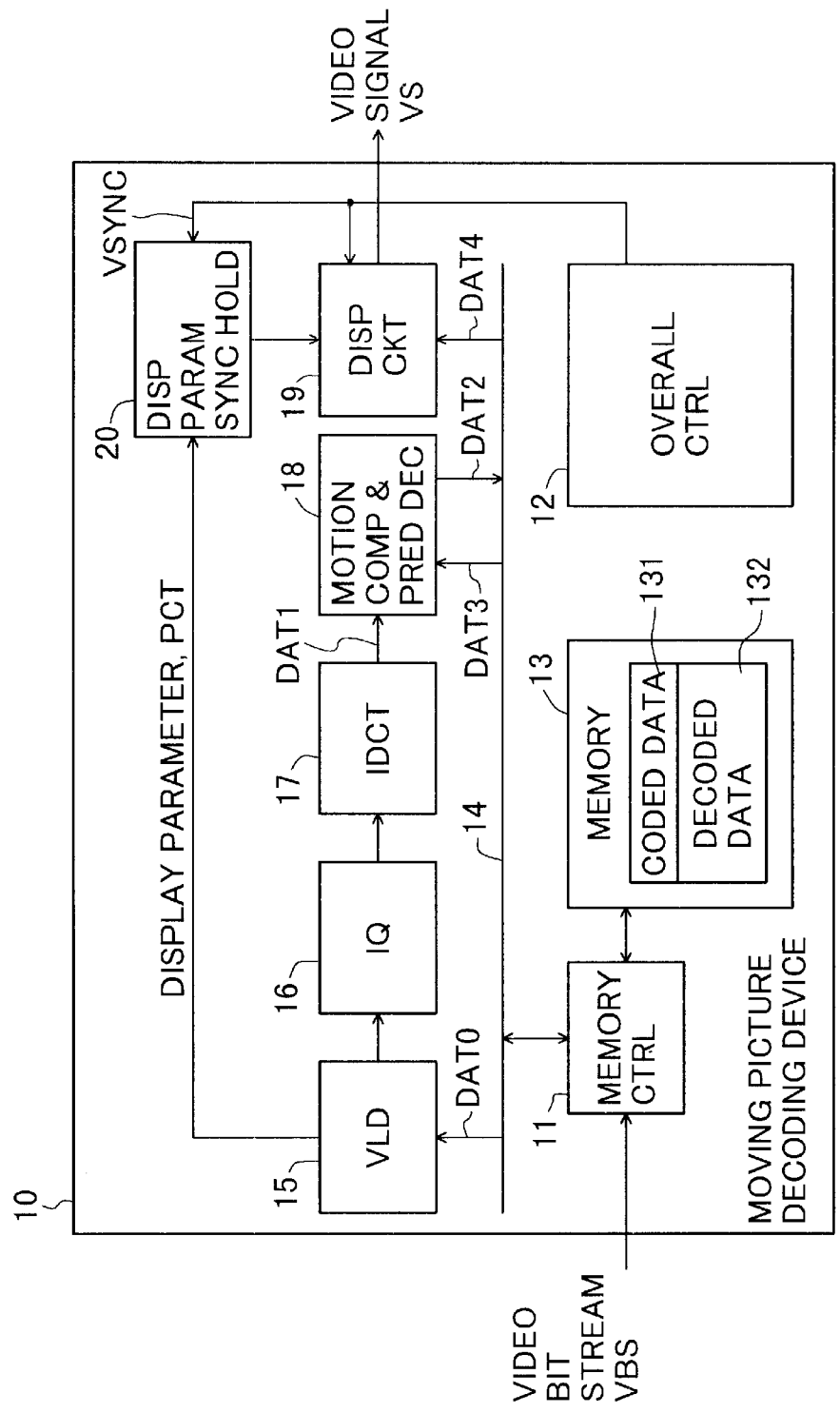
FIG. 1 is a block diagram showing a moving picture decoding device according to an embodiment of the present invention.

FIG. 1 shows a block diagram of moving picture decoding device 10.

Video bit stream VBS coded according to MPEG2 standard is provided into memory control circuit 11 of moving picture decoding device 10. In device 10, video bit stream VBS is temporarily stored in coded data area 131 of memory 13 at a high rate by memory control circuit 131 on the basis of instructions from overall control circuit 12, and data in this area 131 is read out at a lower rate than that of storing, wherein the data is provided into variable length decoding circuit 15 via memory bus 14 as coded picture data DAT0. DAT0 is converted to a quantized DCT coefficient by variable length decoding circuit 15, is converted to a DCT coefficient by inverse quantization circuit 16 and further converted to picture data DAT1 by inverse DCT circuit 17.

Control data contained in DAT0 is separated by variable length decoding circuit 15, and part thereof is provided into overall control circuit 12, wherein this part contains picture coding type PCT.

If DAT1 is I-picture (intra coded picture), it passes through motion compensating circuit 18 including a predictive decoding circuit without processing and is stored through memory bus 14 and memory control circuit 11 into decoded data area 132 of memory 13 as decoded picture data DAT2. If DAT1 is P-picture (predictive coded picture) or B-picture (bi-directional predictive coded picture), decoded reference picture data is read from decoded data area 132 of memory 13 by memory control circuit 11 and is provided into predictive decoding circuit 18 as decoded reference picture data DAT3. A predictive picture is generated from DAT3 and DAT1 is added thereto to cause decoded picture data DAT2 to be generated, wherein the same is stored through memory bus 14 and memory control circuit 11 into area 132.

Data in area 132 is read out by memory control circuit 11 in the order of pictures before coding and is provided through memory bus 14 into display circuit 19 as decoded picture data DAT4 for display, wherein the format thereof is converted on the basis of display parameter from display parameter synchronous holding circuit 20. Thereafter, the data is converted into analog signals to generate video signals VS.

The display parameters and picture coding type PCT of the control data separated by variable length decoding circuit 15 are provided into display parameter synchronous holding circuit 20. Furthermore, synchronization signal ST which is delimiter signal is generated picture by picture by variable length decoding circuit 15 and is provided into display parameter synchronous holding circuit 20.

Display parameter synchronous holding circuit 20 holds display parameters in response to the picture coding type PCT as described later, wherein the display parameters corresponding to pictures processed by display circuit 19 are provided into display circuit 19 in synchronization with vertical synchronization signal VSYNC coming from overall control circuit 12.

Figure 2:
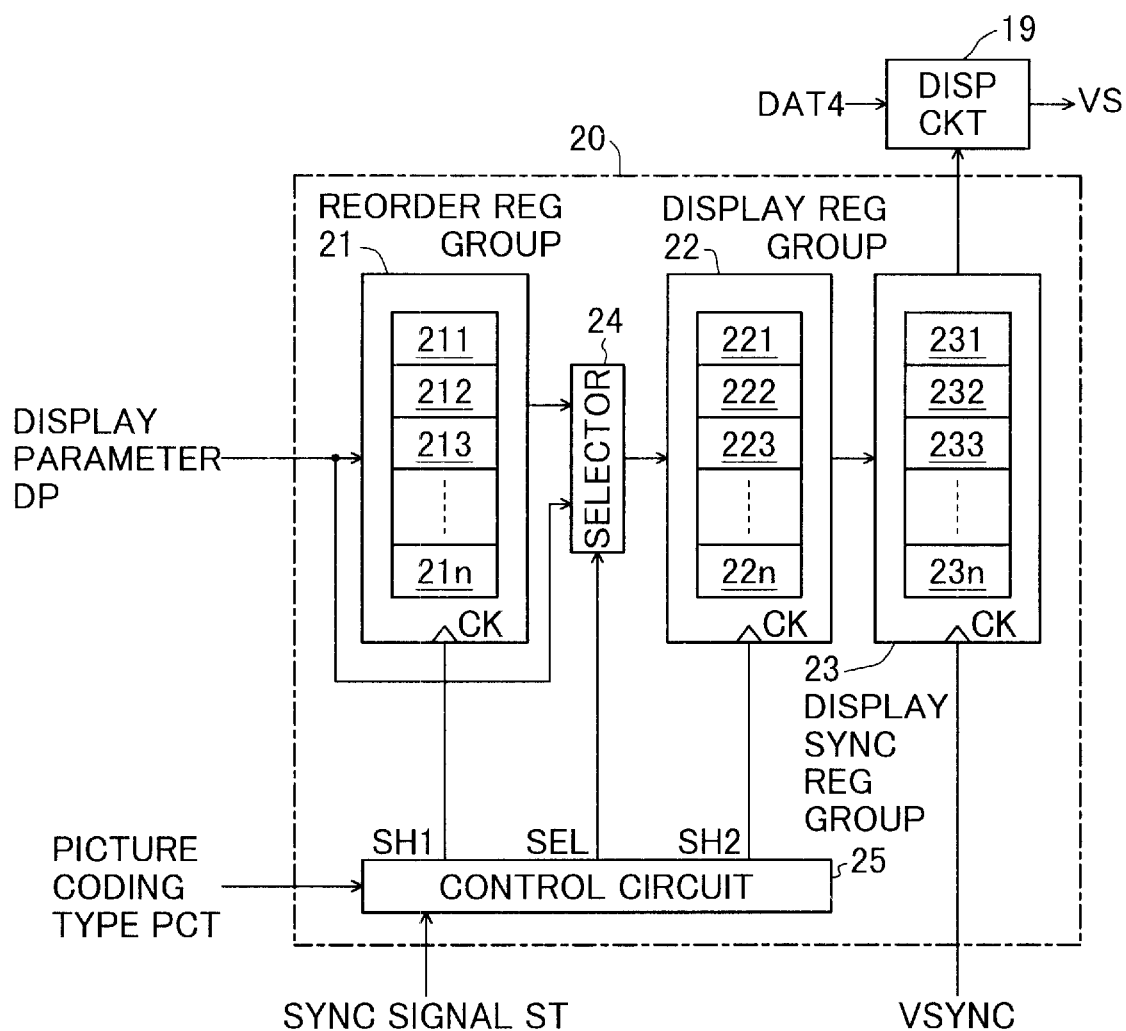
FIG. 2 is a block diagram showing an embodiment of a display parameter synchronous holding circuit in FIG. 1.

FIG. 2 shows an embodiment of display parameter synchronous holding circuit 20.

Circuit 20 is provided with reorder register group 21, display register group 22 and display synchronous register group 23, each of which has "n" registers and has the same construction. Parallel display parameter DP is provided into the data input of register group 21. Display parameter DP and data output from registers 211 to 21n of register group 21 are provided to selector 24 and one of them is selected by selector 24 and is simultaneously provided into the data input of registers 221 to 22n of register group 22. The output of data stored in register 221 to 22n is simultaneously provided into the data input of registers 231 to 23n of register group 23. The output of data stored in registers 231 to 23n is simultaneously provided into display circuit 19.

Control circuit 25 generates selection control signal SEL and latch signals SH1 and SH2 on the basis of picture coding type PCT and synchronization signal ST, and they are respectively provided into selection control input of selector 24 and clock inputs CK of register groups 21 and 22. VSYNC is provided into the clock input CK of register group 23.

Control circuit 25 judges the code of picture coding type PCT in synchronization with signal ST. In a case where control circuit 25 judges that the PCT indicates I-picture or P-picture (reference picture), selector 24 is caused to select the output of register group 21, whereby the outputs of registers 211 to 21n are simultaneously caused to be provided into registers 221 to 22n. Next, latch signal SH2 is made active and output of register group 21 is stored in register group 22, and subsequently latch signal SH1 is made active and display parameters DP are stored in registers 211 to 22n of register group 21. This process is carried out at points t1, t6 and t12 of time in FIG. 4 which is an operation illustration of the circuit of FIG. 2 and corresponds to FIG. 5.

In a case where control circuit 25 judges that the PCT indicates B-picture (non-reference picture), selector 24 is caused to select display parameters DP, thereby causing DP to be provided into registers 221 to 22n, wherein latch signal SH2 is made active to cause DP to be stored in register group 22. This process is carried out at points t2, t4, t8, t10, t14 and t16 of time in FIG. 4.

Figure 4:
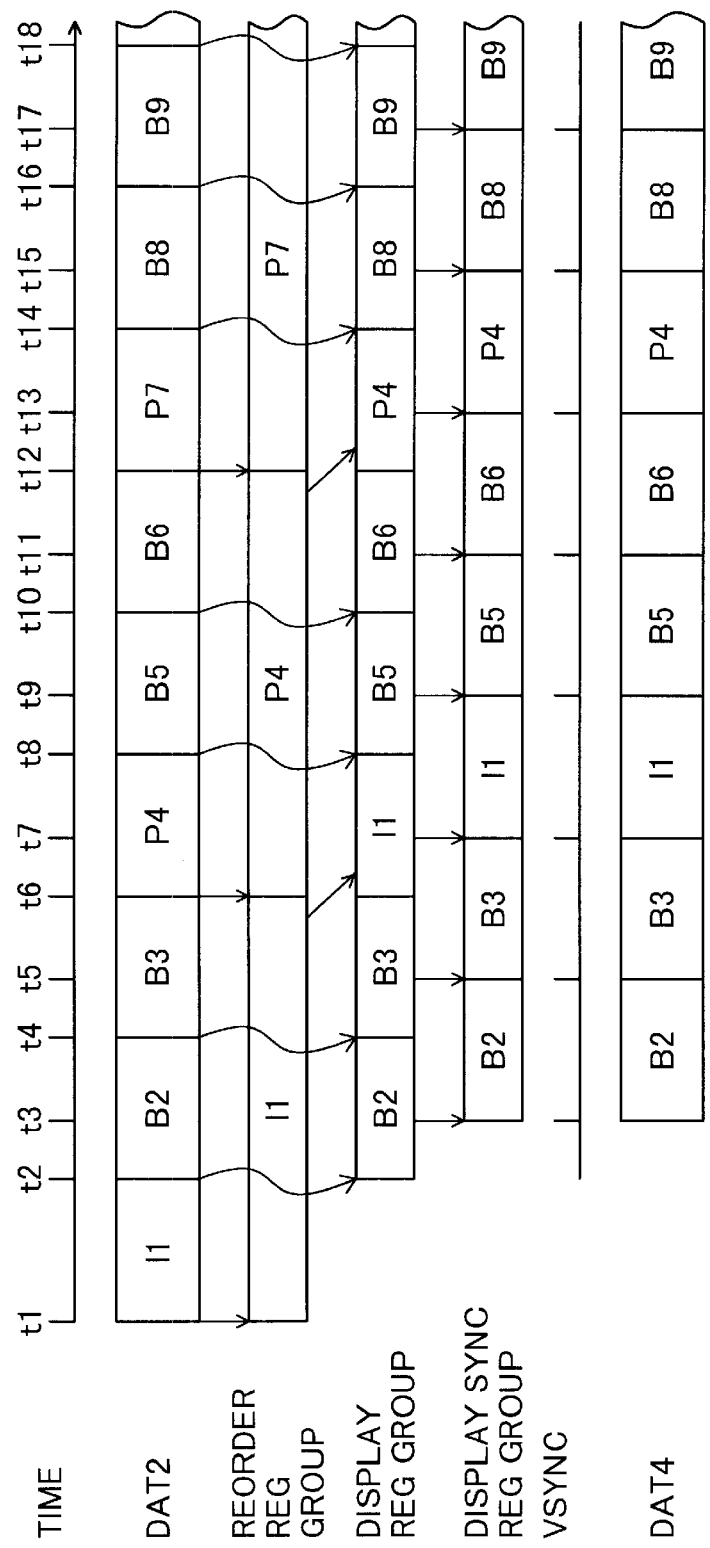
FIG. 4 is an illustration showing operations of the circuit of FIG. 2.
Figure 5:
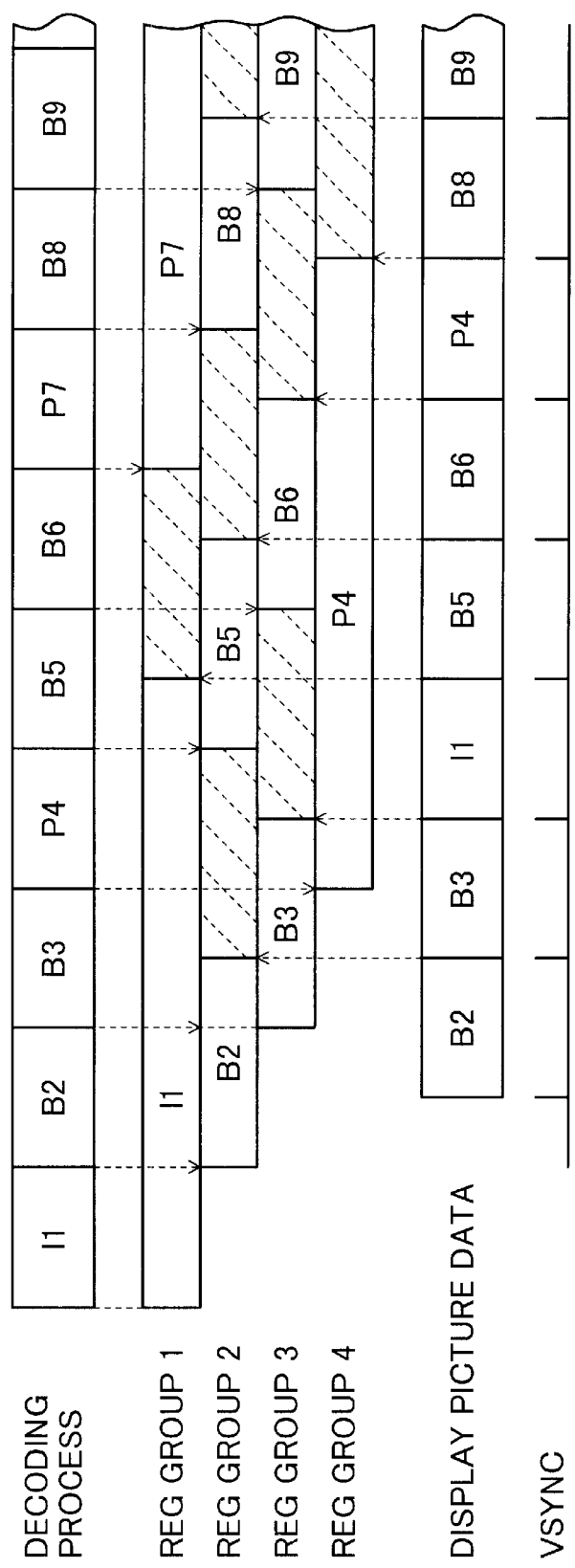
FIG. 5 is an illustration showing operations of prior art display parameter synchronous holding.

The content of register group 23 is updated at points t3, t5, t7, t9, t11, t13, t15 and t17 of time in FIG. 4.

Figure 3A:
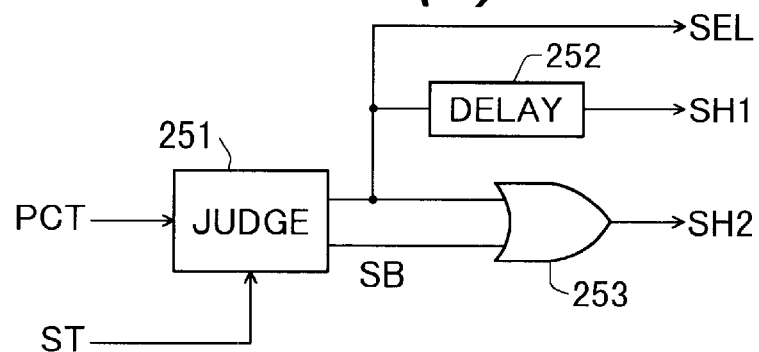
FIG. 3(A) is a diagram showing an embodiment of a control circuit in FIG. 2.
Figure 3B:
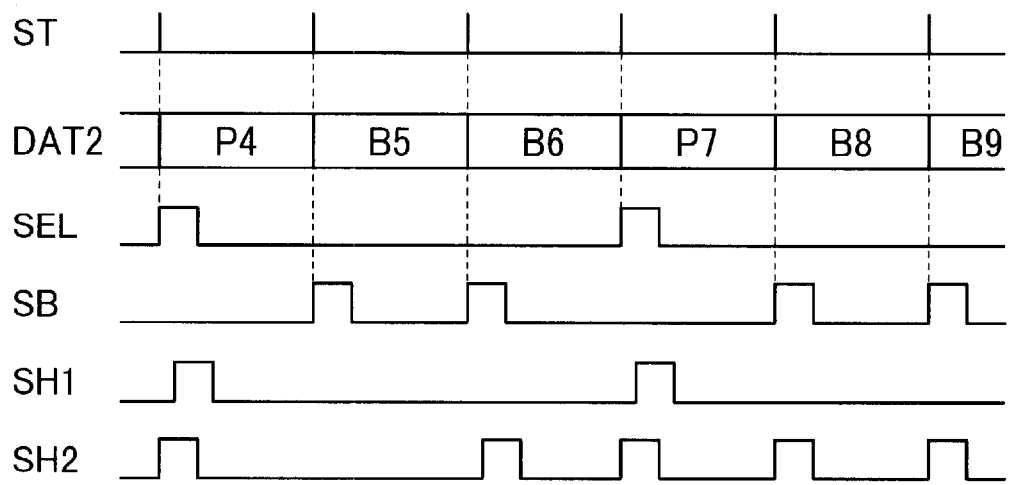
FIG. 3(B) is a time chart showing operations of the circuit of FIG. 3(A)

FIG. 3(A) shows an embodiment of control circuit 25 of FIG. 2, and FIG. 3(B) is a time chart showing operation of this circuit. DAT2 in FIG. 3(B) is part thereof in FIG. 4.

Judging circuit 251 judges whether or not the PCT indicates a reference picture, at a timing of rise of synchronization signal ST. If judging circuit 251 judges that the PCT indicates a reference picture, selection control signal SEL is caused to go high for a predetermined time. While SEL is high, selector 24 selects output of register group 21, and while SEL is low, selector 24 selects display parameters DP. SEL passes through delay circuit 252 to become a latch signal SH1.

If judging circuit 251 judges that the PCT indicates a non-reference picture at a timing of rise of synchronization signal ST, signal SB is caused to go high for a predetermined time. SB and SEL are provided into OR gate 253 from which latch signal SH2 is outputted.

Such a control circuit 25 carries out the abovementioned operation.

According to the present embodiment, since display parameter synchronous holding circuit 20 is provided with only three sets of register groups, the configuration scale of display parameter synchronous holding circuit 20 can be further reduced than in a prior art case where four sets are provided. Furthermore, since it is enough for the control circuit 25 only to control selector 24 and make latch signals SH1 and SH2 active on the basis of picture coding type PCT, hold control of the data into register groups becomes simple. Still furthermore, it is essential only that the output of register group 22 is stored in register group 23 at a timing of VSYNC and the output of register group 23 is provided into display circuit 19, and it is not necessary to select data to be provided into display circuit 19 from a plurality of register groups. Therefore, it becomes simple to read data from register groups.

Although preferred embodiment of the present invention has been described, it is to be understood that the invention is not limited thereto and that various changes and modifications may be made without departing from the spirit and scope of the invention.

For example, display parameters DP may be bit or word serial data. In a case of word serial data, display parameters DP may be sequentially stored in registers 211 to 21n or 221 to 22n with address signals coming from variable length decoding circuit 15. Furthermore, bit or word serial data may be transferred from registers 221 to 22n to registers 231 to 23n.

Another synchronization signal in a blanking period may be generated and used as a display synchronization signal instead of VSYNC.

What is claimed is:

1. A moving picture decoding device which separates display parameters and a picture coding type from coded data, decodes said coded data, stores said separated display parameters, reads said stored display parameters in the order of display pictures, and processes decoded data according to said read display parameters, said decoding device comprising:

a first register group having a data input to receive said separated display parameters, a clock input to receive a first latch signal to store said separated display parameters and a data output to provide the stored display parameters;

a selecting circuit having a first and second data inputs coupled to said data input and data output, respectively, of said first register group, a selection control input to receive a selection control signal, and a data output to selectively provide data on said first and second data inputs thereof when said selection contol signal indicates first and second states, respectively;

a second register group having a data input coupled to said data output of said selecting circuit, a clock input to receive a second latch signal on said data input thereof, and a data output to provide the stored data thereof;

a third register group having a data coupled to said data output of sid second register group, a clock input to receive a display synchronization signal to store data on said data input thereof, and a data output to provide the stored data thereof as said display parameters in the order of display pictures; and a control circuit having an input to receive a picture coding type signal, a selection control output to provide said selection control signal of said first and second states when said picture coding type signal indicates a reference picture for decoding another type signal indicates a reference picture for decoding another picture and a non-reference picture, respectively, a first latch control output to provide said first latch signal with being activated when said picture coding type indicates said reference picture, and a second latch control output to provide said second latch signal with being activated when said picture coding type indicates said non-reference picture.

2. A moving picture decoding device according to claim 1, wherein said control circuit comprises:

a judging circuit for judging whether said picture coding type indicates said reference picture or said non-reference picture; and a control signal generating circuit for generating said selection control signal, said first latch signal and said second latch signal in compliance with judgement result of said judging circuit.

3. A moving picture decoding device according to in claim 2, wherein said judging circuit outputs a first pulse when said picture coding type indicates said reference picture, outputs a second pulse when said picture coding type indicates said non-reference picture, and wherein said control signal generating circuit outputs said first pulse as said selection controlling signal, outputs a delayed signal of said first pulse as said first latch signal, and outputs a signal corresponding to a logical add of said first pulse and said second pulse as said second latch signal.

4. A moving picture decoding device according to claim 1, wherein said display synchronization signal is a vertical synchronization signal.

5. A moving picture reproducing device including a moving picture decoding device, said decoding device separates display parameters and a picture coding type from coded data, decodes said coded data, stores said separated display parameters, reads said stored display parameters in the order of display pictures, and processes decoded data according to said read display parameters, said decoding device comprising:

a first register group having a data input to receive said separated display parameters, a clock input to receive a first latch signal to store said separated display parameters and a data output to provide the stored display parameters;

a selecting circuit having a first and second data inputs coupled to said data input and data output, respectively, of said first register group, a selection control input to receive a selection control signal, and a data output to selectively provide data on said first and second data inputs thereof when said selection control signal in dictates first and second states, respectively;

a second register group having a data input coupled to said data output of said selecting circuit, a clock input to receive a second latch signal to store on said data input thereof, and data output to provide the stored data thereof a third register group having a data input coupled to said data output of said second register group, a clock input to receive a display synchronization signal to store data on said data input thereof, and a data output to provide the stored data thereof as said display parameters in order of display pictures; and a control circuit having an input to receive a picture coding type signal, a selection control output to provide said selection control signal of said first and second states when said picture coding type signal indicates a reference picture for decoding another picture and a non-reference picture, respectively, a first latch control output to provide said first latch signal with being activated when said picture coding type indicates said reference picture, and a second latch control output to provide said second latch signal with being activated when said picture coding type indicates said non-reference picture.

6. A moving picture decoding method which separates display parameters and a picture coding type from coded data, decodes said coded data, stores said separated display parameters, reads said stored display parameters in the order of display pictures, and processes decoded data according to said read display parameters, said method comprising:

preparing a first, a second, and a third register groups coupled to each other in cascade;

outputting by a control circuit said selection controlling signal to select said output of said first register group, outputting said second latch signal with being activated and next outputting said first latch signal with being activated when said picture coding type indicates a reference picture, for decoding another picture, and outputting said selection controlling signal to select said separated display parameters, outputting said second latch signal with being activated when said picture coding type indicates a non-reference picture;

storing a content of said first register group into said second register group and storing said separated display parameters into said first register group when said picture coding type indicates a reference picture for decoding another picture;

storing said separated display parameters into said second register group when said picture coding type indicates a non-reference picture; and storing a content of said second register group into said third register group as a display parameter in the order of said display pictures in synchronization with a display synchronization signal.

* * * * *